United States Patent [19]

Neal et al.

[11] 4,286,612
[45] Sep. 1, 1981

[54] FOLDING TENT

[76] Inventors: William Neal; Mary Neal, both of 191 Denise, San Pablo, Calif. 94806

[21] Appl. No.: 18,341

[22] Filed: Mar. 7, 1979

[51] Int. Cl.³ .................................................. A45F 1/16
[52] U.S. Cl. ........................................................ 135/4 R
[58] Field of Search ............................. 135/4 R, 1 R

[56] References Cited

U.S. PATENT DOCUMENTS

| | | | |
|---|---|---|---|
| 24,255 | 5/1859 | Williams | 135/4 R |
| 1,913,572 | 6/1933 | Thonet-Drechsel | 135/4 R |
| 3,536,083 | 10/1970 | Reynolds | 135/4 R |
| 3,540,458 | 11/1970 | Osterhoudt | 135/4 R |
| 3,578,003 | 5/1971 | Everett | 135/4 R |
| 3,799,608 | 3/1974 | Smutny | 135/4 R |

FOREIGN PATENT DOCUMENTS

| | | | |
|---|---|---|---|
| 1154051 | 10/1957 | France | 135/4 R |
| 862011 | 3/1961 | United Kingdom | 135/4 R |

*Primary Examiner*—J. Karl Bell

*Attorney, Agent, or Firm*—LeBlanc, Nolan, Shur & Nies

[57] ABSTRACT

A folding tent for dogs and other domestic animals is provided which is sturdy in structure, convenient to set up and knock down, and substantially rigid when assembled. The tent includes a foldable frame comprising a pair of U-shaped support members pivotally attached to another U-shaped frame member which serves as a base. Each U-shaped support member is pivotable from a folded position to an upright position. The frame includes a set of support rods which are attachable longitudinally between the U-shaped support members in the upright positions. A cover is adapted to fit over the upright U-shaped support members and support rods to provide a protective enclosure. Preferably, the U-shaped support members are pivotally mounted on stabilizer rods extending transversely between the legs of the U-shaped base member which enhance the rigidity of the frame. A plurality of fastening straps are provided on the cover to enable the frame and cover to be firmly secured to the ground.

6 Claims, 6 Drawing Figures

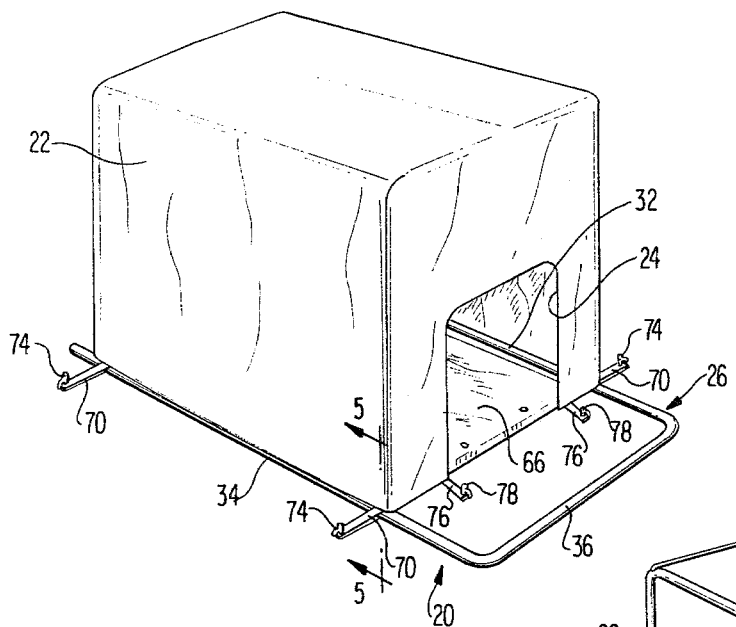
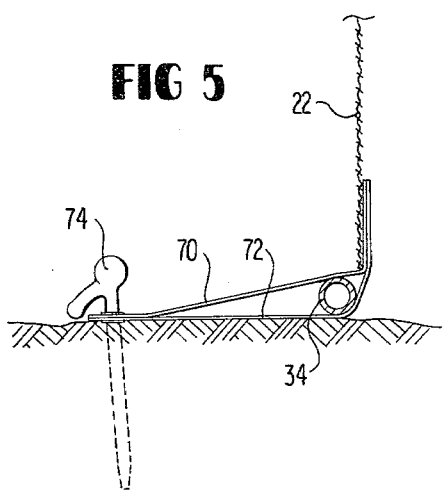
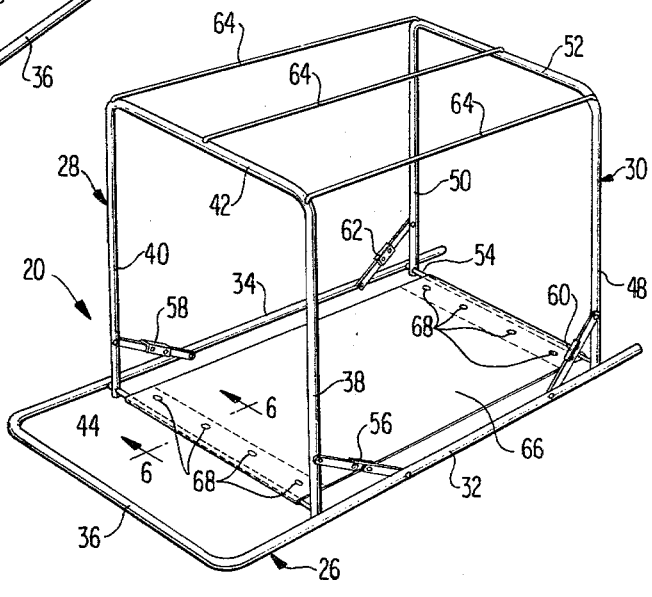
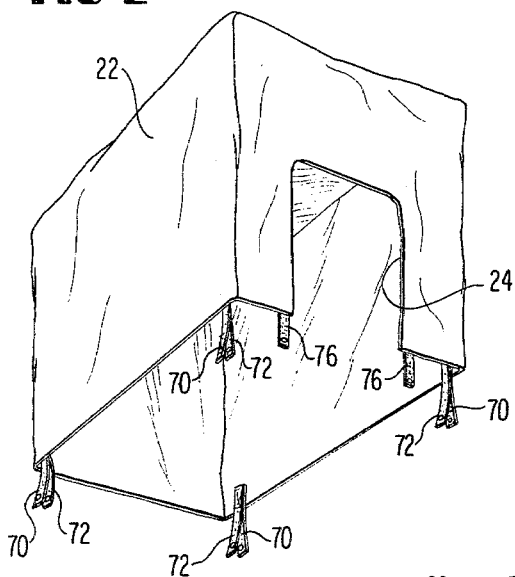
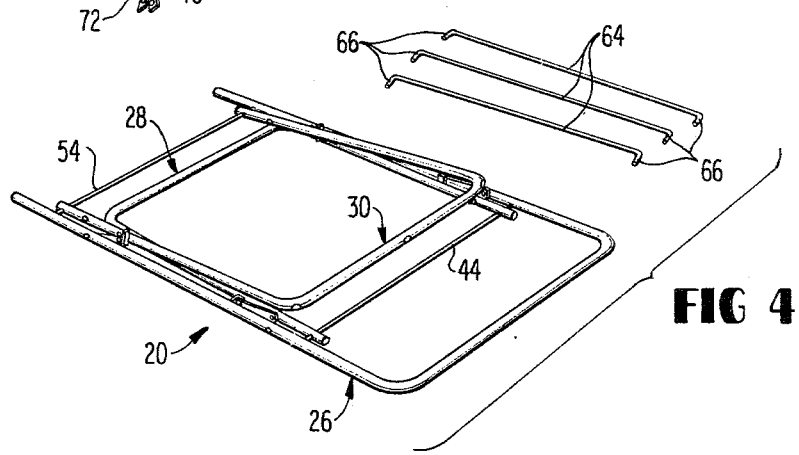

FOLDING TENT

The present invention relates to a folding tent and, more particularly, to a folding tent suitable for dogs and other pets. Specifically, this invention relates to a folding tent for domestic animals comprising a foldable frame which is sturdy in structure, easy to set up and knock down, and adapted to support a cover which provides a protective enclosure for the animals. The folding tent is especially suitable for use on camping and hunting trips and also for home use.

Various tents and shelters have been developed in the prior art which are intended to be used for pets and other domestic animals. Some of the prior art tents have been quite sturdy in structure but difficult to conveniently set up and knock down. These tents have not been well adapted for use in camping and hunting trips where it is necessary to frequently break camp and move to different locations. See, for example, U.S. Pat. No. 1,887,108 which discloses an animal shelter having two flexible metal stays secured in semicircular configuration to a flat base by thumbscrews to support a fabric cover.

Although it has been proposed to provide foldable tents and shelters for animals, the foldable tents of the prior art have tended to be flimsy in structure and somewhat unstable when set up. Thus, there has been a tendency for the prior art foldable tents to collapse in use. See, for example, U.S. Pat. No. 2,854,948 which discloses a foldable sleeping bag for pets and U.S. Pat. No. Des. 232,850 which illustrates a dog bed.

The present invention contemplates an improved folding tent for animals which is sturdy in structure, easy to set up and knock down, and stable when assembled. The invention achieves these results by providing a folding tent including a foldable frame comprising a base member having a pair of spaced parallel legs on its opposite sides adapted to rest horizontally on the ground and a pair of U-shaped support members pivotally connected at spaced locations to the legs of the base member and pivotable from folded positions to upright positions, a set of support rods attachable longitudinally between the U-shaped support members in the upright positions, and a cover adapted to fit over the U-shaped support members and support rods to provide a protective enclosure.

In a preferred embodiment of the invention, the foldable frame comprises a set of three tubular U-shaped frame members, each frame member comprising a pair of legs with free ends extending substantially parallel from a central portion of the frame member. One of the U-shaped frame elements constitutes the base member of the foldable frame with the other pair of frame members constituting the support members and having the free ends thereof pivotally connected at spaced parallel locations to the legs of the base member. Each support member is provided with a set of holes in its central portion for receiving the ends of the support rods.

Preferably, the foldable frame includes a pair of stabilizer rods extending laterally between the legs of the base member to enhance its rigidity. Each leg of the base member is provided with a set of holes on its inside wall for receiving the ends of the stabilizer rods. Preferably, the free ends of the U-shaped support members are pivotally attached to the stabilizer rods. In addition, a floor is provided which is adapted to be removably secured to the stabilizer rods.

The preferred embodiment also includes means for securing the frame and tent cover to the ground. A plurality of pairs of straps is mounted at the periphery of the cover, each pair including a first strap adapted to fit over one leg of the base member and a second strap adapted to fit underneath the leg of the base member, and both adapted to be fastened by a single stake to the ground. The cover is generally rectangular in configuration and provided with an entrance opening. A pair of straps is mounted on the cover on opposite sides of the entrance opening and adapted to be secured by separate stakes to the ground.

Accordingly, it is an object of this invention to provide a folding tent for animals which is sturdy in structure and convenient to set up and knock down.

It is also an object of the invention to provide an improved folding tent for pets and other domestic animals comprising a foldable frame and cover which is rigid when set up and resistant to inadvertent collapse.

Another object of the invention is to provide a folding tent for animals in which the foldable frame and cover are adapted to be securely fastened to the ground.

A further object of the invention is to provide a folding tent which is foldable into a compact configuration for travel and storage.

These and other objects will be readily apparent with reference to the drawing and following description wherein:

FIG. 1 is a perspective view of a folding tent embodying the present invention which includes a foldable frame and a cover adapted to provide a protective enclosure;

FIG. 2 is a perspective view of the tent cover removed from the foldable frame;

FIG. 3 is a perspective view of the foldable frame with the cover removed;

FIG. 4 is a perspective view of the foldable frame in its knocked down configuration;

FIG. 5 is an enlarged section taken along line 5—5 of FIG. 1 illustrating a set of fastening straps provided on the tent cover used to fasten the foldable frame and cover to the ground; and FIG. 6 is an enlarged section taken along line 6—6 of FIG. 3 illustrating a snap fastener used to secure the floor of the tent to the foldable frame.

Referring to FIG. 1, a folding tent embodying the invention comprises a foldable frame, generally 20, on which a cover 22 is supported to provide a protective enclosure for pets and other domestic animals. Cover 22 is generally rectangular in configuration and includes a rectangular entrance opening 24. The cover preferably consists of waterproof canvas or nylon.

As shown in FIG. 3, foldable frame 20 comprises a set of three tubular U-shaped frame members 26, 28 and 30. Frame member 26 provides the base of the foldable frame and includes a pair of spaced parallel legs 32 and 34 extending substantially parallel from a front or central portion 36 of the frame member which are adapted to rest horizontally along the ground. The U-shaped frame members and other components of frame 20 are preferably made of a strong and lightweight metal, e.g., aluminum or an aluminum alloy.

U-shaped members 28 and 30 provide upright or support members for the tent cover. U-shaped support member 28 includes a pair of legs 38 and 40 extending substantially parallel from a central portion 42. The free ends of legs 38 and 40 are pivotally connected to base member 26 by a stabilizer rod 44 extending between legs 32 and 34 at a position spaced back from front portion 36 of the base member. Each of legs 32 and 34 is provided with a hole on its inside wall for receiving the ends of stabilizer rod 44. Similarly, U-shaped support member 30 includes a pair of legs 48 and 50 extending substantially parallel from a central portion 52. The free ends of legs 48 and 50 are pivotally connected to base member 32 by a stabilizer rod 54 extending between the free ends of legs 32 and 34. Each of legs 32 and 34 is provided with a hole on its inside wall for receiving the ends of stabilizer rod 54. Stabilizer rods 44 and 54 are located at spaced parallel locations along base member 26.

Preferably, a first pair of locking brackets 56 and 58 is provided to enable support member 28 to be locked in its upright position. Similarly, a second pair of locking brackets 60 and 62 is provided to enable support member 30 to be locked in its upright position. These brackets serve to enhance the overall rigidity of the assembled tent.

Foldable frame 20 includes a plurality of support rods 64 which are attachable longitudinally between support members 28 and 30 in the upright positions. Preferably, central portions 42 and 52 of support members 28 and 30 are provided with a set of holes for receiving the ends of longitudinal support rods 64. As shown in FIG. 4, each support rod 64 has a pair of perpendicularly bent end portions 66 which are adapted to be received in the holes provided in the central portions of support members 28 and 30.

Referring to FIGS. 3 and 6, a preferred embodiment of the folding tent includes a floor 66, e.g., a flat piece of canvas or vinyl, which is adapted to be removably secured to stabilizer rods 44 and 54. Preferably, floor 66 is sufficient in length to allow its opposite ends to be turned underneath stabilizer rods 44 and 46 and to be fastened to itself by a set of snap fasteners 68 which allow the floor to be conveniently removed for cleaning purposes.

As shown in FIG. 4, foldable frame 20 is collapsible into a compact configuration with U-shaped support members 28 and 30 folded downward over each other. When it is desired to set up the folding tent, support members 28 and 30 are pivoted upward and locked in upright positions by brackets 56 and 58 and brackets 60 and 62, respectively. Longitudinal support rods 64 are inserted into the holes provided in central portions 42 and 52 of the support members to complete the frame assembly. Thereafter, floor 66 is assembled to stabilizer rods 44 and 54, and rectangular cover 22 is placed over the frame to provide a protective enclosure.

Referring to FIG. 2, cover 22 preferably includes four pairs of straps 70 and 72 which are sewn or otherwise attached at its lower corners and used to secure the frame and cover to the ground. Preferably, each strap is provided with an eyelet for receiving a stake 74 (FIG. 5) which is driven into the ground. The provision of the fastening straps in pairs allows one strap to fit over the respective leg of base member 26 and the other strap to fit underneath the leg of the base member. Thus, as shown in FIG. 5, with strap 70 fit over leg 34 of the base member and strap 72 fit underneath, stake 74 serves to secure both the frame and cover to the ground.

In addition, the cover includes a pair of fastening straps 76 (FIG. 2) mounted on opposite sides of entrance opening 24. Both straps 76 include eyelets adapted to receive stakes 78 (FIG. 1) which are driven into the ground.

In conclusion, this invention provides a folding tent for pets and other domestic animals comprising a foldable frame and cover which is sturdy in construction, convenient to set up and knock down, and substantially rigid when assembled. The cover includes a set of fastening straps which enables the frame and cover to be firmly secured to the ground. The frame is advantageously foldable into a compact configuration for travel and storage.

While a specific embodiment for the invention has been shown and described in detail, it will be understood that the invention may be modified without departing from the spirit of the inventive principles as set forth in the appended claims.

What is claimed is:

1. A folding tent comprising:

a foldable frame including a U-shaped base member having a pair of spaced parallel legs on opposite sides thereof adapted to rest horizontally on the ground and a pair of U-shaped upright support members having apertures through the end portion of the legs thereof;

said U-shaped upright support members having pivotally connected at spaced locations to said legs of said member and pivotable from a folded position wherein said frame is collapsed with the three U-shaped members contained in substantially the same plane to an upright position wherein one of said upright support members extends upwardly across an end portion of said base between the legs thereof and the other member is disposed parallel thereto across the opposite end portion of said base, opposed ends of said upright members being pivotally connected to opposite legs of said U-shaped base member; means connected between the legs of the base and the upright member for locking said members in an upright position;

a pair of spaced stabilizer rods, each rod mounted between opposite legs of said base member and extending through adjacent apertures in the end portions of a respective upright support whereby said rods pivotally connect said uprights to said base;

a set of support rods attachable longitudinally between said upright U-shaped support members in the upright positions thereof;

a cover adapted to fit over said U-shaped upright support members and support rods to provide a protective enclosure, said cover being generally rectangular in cross sectional configuration and being provided with an entrance opening adjacent an end of said base; and a floor member adapted to be removably attached to said stabilizer rods including a rectangular sheet having a set of snap fasteners at opposite ends thereof whereby said ends may be removably secured to said rods.

2. The folding tent of claim 1, wherein
each leg of said base member is provided with a set of openings on its inside wall for receiving the ends of said stabilizer rods.

3. The folding tent of claim 1, which includes:
means for securing said frame and cover to the ground.

4. The folding tent of claim 3, wherein said securing means comprises:

a plurality of pairs of straps mounted at the periphery of said cover, each pair including a first strap adapted to fit over one leg of said base member and a second strap adapted to fit underneath said leg, both straps adapted to be fastened by a single stake to the ground.

5. The folding tent of claim 1, wherein:
each support member is provided with a set of holes in its central portion for receiving the ends of said support rods.

6. The folding tent of claim 3, wherein said securing means includes:
a pair of straps mounted on said cover at opposite sides of said entrance opening and adapted to be secured by stakes to the ground.

* * * * *